United States Patent [19]
Bissonnette

[11] Patent Number: 5,690,091
[45] Date of Patent: Nov. 25, 1997

[54] SPEARGUN PROJECTILE ASSEMBLY

[76] Inventor: Laurent C. Bissonnette, 160 Sea Meadow Dr., Portsmouth, R.I. 02871

[21] Appl. No.: 668,035

[22] Filed: Jun. 17, 1996

[51] Int. Cl.⁶ ............................................. F41B 11/00
[52] U.S. Cl. ........................ 124/80; 124/69; 124/73; 102/399; 102/504
[58] Field of Search ........................... 124/1, 56, 69, 124/73, 74, 75, 76, 80; 43/6; 102/399, 504; 273/416

[56] References Cited

U.S. PATENT DOCUMENTS

| | | | |
|---|---|---|---|
| 265,969 | 10/1882 | Lyon et al. | 102/504 |
| 267,027 | 11/1882 | Shaw | 102/504 X |
| 2,101,198 | 12/1937 | Robinson | 124/69 |
| 2,805,622 | 9/1957 | Cammin-Christy | 102/504 |
| 2,923,286 | 2/1960 | Draganti | 124/69 X |
| 3,669,087 | 6/1972 | Hamrick et al. | 124/74 |
| 3,717,947 | 2/1973 | Nomura | 124/73 X |
| 3,910,189 | 10/1975 | Whidden et al. | 102/504 X |
| 4,505,179 | 3/1985 | Nelson et al. | 102/504 X |
| 5,086,749 | 2/1992 | Ekstrom | 124/74 |
| 5,373,832 | 12/1994 | D'Andrade | 124/69 |
| 5,373,833 | 12/1994 | D'Andrade | 124/69 |
| 5,398,587 | 3/1995 | Kornblith | 102/504 X |

*Primary Examiner*—John A. Ricci
*Attorney, Agent, or Firm*—Michael J. McGowan; Robert W. Gauthier; Prithvi C. Lall

[57] ABSTRACT

A projectile assembly for use in a breech loading hydraulic speargun. The assembly consists of a dart connected to a plug end. The assembly is inserted into the breech end of the speargun barrel with the plug end sealing the breech end of the barrel. A trigger mechanism on the speargun releases water under pressure into the barrel at the location of the connection between the dart and the plug. The dart separates from the plug and is ejected out the muzzle end of the barrel. A lanyard is attached between the plug remaining in the barrel and the dart and the lanyard is payed out through the barrel as the dart travels to its target. The plug end is removable from the barrel and is made buoyant for convenient retrieval of the dart.

5 Claims, 2 Drawing Sheets

SPEARGUN PROJECTILE ASSEMBLY

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED PATENT APPLICATIONS

This patent application is co-pending with related patent applications entitled HYDRAULIC IMPULSE SPEARGUN Ser. No. 08/668,033 and LANYARD RETAINER FOR A SPEARGUN PROJECTILE Ser. No. 08/668,034 by the same inventor as this application.

BACKGROUND OF THE INVENTION

(1) Field of the Invention

The present invention relates to underwater spearguns, and deals more particularly with a projectile assembly for a hydraulically operated impulse gun especially suited to loading underwater. The kinetic energy for launching the spear or projectile from the gun is provided by the release of fluid under pressure from an elastomeric energy storing device.

(2) Description of the Prior Art

Underwater guns of the type used to spear fish generally provide for some form of elastic or pneumatic catapult system. In the elastic catapult a long spear is launched by means of a stretched elastic band. The elastic band is stretched and attached to the spear. The spear is prevented from moving by a trigger mechanism. When the trigger is actuated, the elastic band contracts and catapults the spear from the gun. Stretching the rubber band and attaching it to the spear is a difficult task, especially when done while swimming. Loading these spearguns becomes a dangerous task which often results in cuts and bruises.

In the pneumatic catapult type of speargun, an air spring is provided for launching the projectile. The speargun is loaded by forcing the spear or a special loading pole against an air piston, compressing the air behind the piston. Accidental release of the loading pole or spear before the trigger mechanism has secured the air piston often results in injury.

Both the elastic and pneumatic catapult spearguns are muzzle loaded and require physical strength and dexterity for safe operation while swimming. The spearguns can be loaded on land where accidental discharge may cause fatal injuries. Without fluid resistance, the spear can travel at high speeds for great distances. The spears are typically attached to the guns by lanyards such that fish or the spear itself can be retrieved when the gun is discharged in water. The length of the lanyard is matched to the maximum flight of the spear in water. When the spear is discharged in the air, the longer flight of the spear pulls the lanyard taught and may cause the spear to recoil back towards the gun and user. Further, the lanyards on present spearguns are most often coiled along the gun barrel. When the gun is discharged, the coiled lanyard unravels rapidly and may easily entangle the gun operator. Finally, the typical spear used is a long thin cylindrical shaft. The hydrodynamic characteristics of this geometry limit the range and precision of present spearguns.

In my prior U.S. Pat. No. 4,848,210 entitled ELASTOMERIC IMPULSE ENERGY STORAGE AND TRANSFER SYSTEM, a generally spherical shaped bladder is pressurized with water to provide potential energy in the form of a working fluid for launching a projectile from a submarine when the pressure is released. An alternative use suggested for the bladder was for powering a speargun.

SUMMARY OF THE INVENTION

Accordingly, it is a general purpose and object of the present invention to provide a speargun projectile assembly which may be easily loaded while underwater.

Another object is to provide a speargun projectile assembly which can be breech loaded for increased safety. A further object is to provide a speargun with a lanyard system which does not expose the speargun operator to entanglement with the lanyard. A still further object is to provide a speargun with a projectile having improved hydrodynamic characteristics for greater range and precision when compared to present speargun projectiles.

These objects are accomplished with the present invention by providing a projectile assembly which can be breech loaded into a speargun with a barrel having an open breech end. The projectile assembly includes a dart type of projectile attached to a plug. The plug serves to close the breech end of the barrel when loaded. The projectile is launched from the barrel by water pressure from a tubular shaped bladder adapted from the generally spherical bladder of my previous invention. The bladder is pressurized by a hand operated pump mechanism attached to the speargun. The trigger mechanism of the speargun allows pressurized water from the bladder to enter the breech end of the barrel just behind the dart type projectile. The force of the water separates the projectile from the plug of the assembly and launches the projectile out the forward or muzzle end of the barrel. The plug remains in the breech end of the barrel and pays out a lanyard attached to the projectile. The payout of the lanyard is contained within the barrel such that the speargun operator cannot become entangled with the lanyard. The shape of the projectile and its trajectory through the barrel results in improved range and precision over conventional speargun projectiles.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
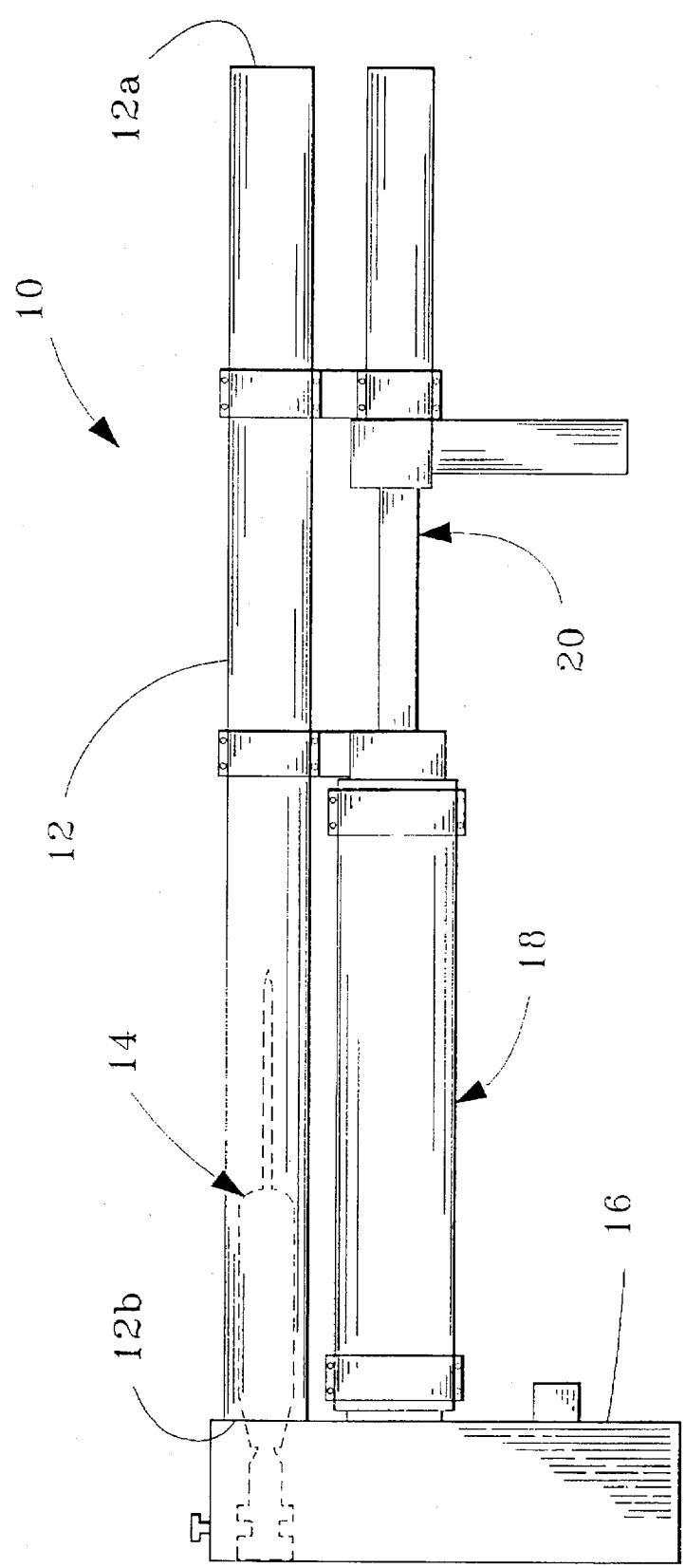
FIG. 1 shows the preferred form for a speargun for which the present invention is ideally suited.
Figure 2:
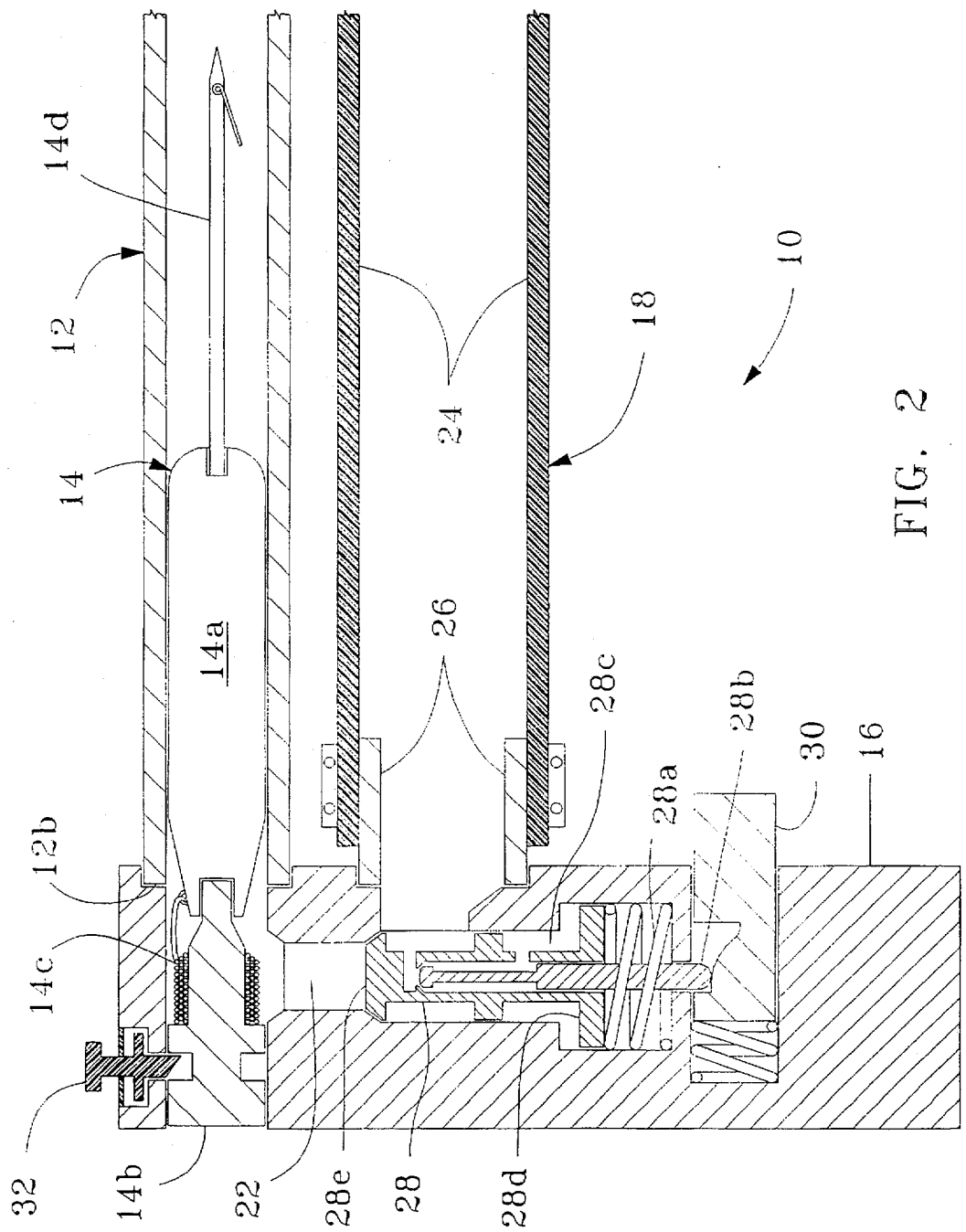
FIG. 2 shows a detail vertical section of the projectile assembly within the stock end of the speargun.

Referring now to FIG. 1, a speargun 10 is illustrated as comprising a barrel 12, having a muzzle end 12a and an opposite breech end 12b, the latter being closed by the projectile assembly 14 shown in phantom. Barrel 12 is secured to stock 16. Elastomeric bladder assembly 18 is secured to stock 16 at one end and is supported on the other end by pump mechanism 20. Pump mechanism 20 is attached to barrel 12. Referring now additionally to the partial detailed cross section of the stock 16 end of speargun 10 shown in FIG. 2, stock 16 defines a passageway 22 having one end communicating with breech end 12b of barrel 12 and the other end in communication with elastomeric bladder assembly 18. Bladder assembly 18 consists of tubular bladder 24 secured at one end to short tube 26, which in turn is secured to stock 16. Control valve 28 is provided in passageway 22 and is biased by spring 28a toward the closed position as shown. Movable trigger 30 is provided in stock 16 and is mechanically linked to control valve 28 such that pressing trigger 30 towards stock 16 allows poppet 28b to move downward. The downward movement of poppet 28b allows fluid under pressure within tubular bladder 24 to enter valve passage 28c which exerts pressure against valve base 28d. This pressure overcomes spring 28a bias, moving valve seat 28e downwards, opening passageway 22 and allowing pressurized fluid into breech end 12b. Pressurized fluid acting on projectile assembly 14 causes dart 14a to separate from plug end 14b and be ejected from muzzle end 12a (not shown on FIG. 2) with great force. Lanyard 14c is secured to and coiled around a forward portion of plug end 14b. The other end of lanyard 14c is secured to dart 14a from which spear end 14d protrudes. Dart 14a and plug 14b are joined by snap joint 14e so as to avoid loss of dart 14a during handling and prior to firing of speargun 10. Snap joint 14e is made such that the force of the water from tubular bladder 24 will overcome the limited frictional forces required to retain dart 14a in the position shown. A release mechanism is provided for plug end 14b as illustrated generally at 32. Plug end 14b is preferably buoyant so as to be readily retrieved when released from barrel 12 in the event that speargun 10 is to be reloaded quickly.

In operating the speargun, the user may have several projectile assemblies 14. Upon entering the water the user will breech load assembly 14 by pulling release mechanism 32 and pushing plug and dart assembly 14 into breech end 12b of the barrel 12. With speargun 10 loaded, the diver or user can then conveniently charge the gun by operating pump mechanism 20. In the preferred embodiment, pump mechanism 20 is hand operated by a series of back and forth strokes. A stroke in one direction allows water to enter pump mechanism 20 and a stroke in the other forces water from pump mechanism 20 into bladder 18 under pressure. A set of check valves in pump mechanism 20 prevents flow in the opposite direction. Depressing trigger 30 causes pressurized fluid to enter breech end 12b of barrel 12, launching dart 14a from muzzle 12a as previously described. The plug end 14b remains in barrel 12 and lanyard 14c deploys so as to permit retrieving the spear after it has been fired. If the diver or user wishes to reload, he may pull up on release mechanism 32 and pull plug end 14b through barrel 12 by the attached lanyard 14c. The buoyant plug end 14b permits dart 14a and anything struck by spear end 14d to be conveniently retrieved. The diver preferably has several plug and dart assemblies 14 so as to permit him to load and fire the gun several times before retrieving his equipment and any catch obtained from use of the device.

What has thus been described is a speargun projectile assembly which is breech loaded in a speargun barrel. The projectile assembly has a dart portion and a plug portion, the plug portion serving to seal the breech end of the barrel. A trigger mechanism releases pressurized water from a bladder portion of the speargun into the breech end of the barrel of the gun. The pressurized fluid forces the dart portion of the assembly to separate from the plug portion and the dart is launched out the muzzle end of the barrel by the force of the water. A lanyard is attached between the breech plug and the dart and is coiled around the plug portion. As the dart portion travels from the muzzle, the lanyard is deployed through the muzzle end of the barrel.

The projectile assembly and the speargun shown and described herein is much safer and easier to load and to use then present elastic or pneumatic spearguns. The breech plug and dart assembly can be loaded into the gun without charging the firing mechanism. Charging the speargun for firing requires a simple back and forth pumping action. There is less likelihood of accidental firing in air since the gun may not be conveniently charged unless the pump mechanism is submerged in water. Stowage of the lanyard within the barrel prevents entanglement and is inherently safer than present designs. The projectile assemblies with the buoyant retainers or breech plugs facilitate rapid firing and reloading of the present speargun. The dart portion is compact and can be shaped for increased range and precision.

Obviously many modifications and variations of the present invention may become apparent in light of the above teachings. For example, the exact shapes and configurations of the particular components shown can be changed to suit manufacturing and assembly considerations. The pump mechanism may be any hand operated mechanism for pressurizing the bladder. A sliding piston could be connected to a handle which can be rotated back and forth to achieve the same result. The trigger mechanism could be fitted with a locking mechanism to prevent accidental firing. The trigger mechanism itself could be replaced with any convenient means for quickly releasing the pressurized fluid from the bladder into the breech end of the barrel. Additionally, the projectile assembly can be adapted for use with conventional elastic or pneumatic catapult spearguns. In an elastic catapult gun, the elastic would be attached to the dart portion. The plug portion would be held in place by a catch mechanism separate from the trigger mechanism used to hold and release the dart. A similar double catch mechanism would be used in a pneumatic catapult speargun.

In light of the above, it is therefore understood that within the scope of the appended claims, the invention may be practiced otherwise than as specifically described.

What is claimed is:

1. A projectile assembly for breech loading into an underwater gun using water under pressure to launch a projectile from a barrel, the projectile assembly comprising:

a plug portion for sealing a breech end of the barrel; and a dart portion connected to the plug portion, the water under pressure entering the barrel at a location intermediate the plug portion and the dart portion causing the dart portion to separate from the plug portion, the dart portion serving as the projectile launched from the barrel by the gun.

2. The assembly of claim 1 wherein the dart portion is hydrodynamically shaped for efficient travel through water.

3. The assembly of claim 1 further comprising a lanyard connected between the dart portion and the plug portion, the lanyard being payed out through the barrel from the plug portion as the dart portion is launched from the gun.

4. The assembly of claim 1 wherein the plug portion is removable from the barrel after launching of the dart portion.

5. The assembly of claim 1 wherein the plug portion is sufficiently buoyant to maintain the assembly afloat.

* * * * *